US012709283B2

(12) United States Patent
Ohsawa

(10) Patent No.: US 12,709,283 B2
(45) Date of Patent: Aug. 18, 2026

(54) PROCESSING METHOD, DRIVING SYSTEM, AND PROGRAM PRODUCT THEREOF

(71) Applicant: DENSO CORPORATION, Kariya-city (JP)

(72) Inventor: Hiroyuki Ohsawa, Kariy-city (JP)

(73) Assignee: DENSO CORPORATION, Kariya-city (JP)

( * ) Notice: Subject to any disclaimer, the term of this patent is extended or adjusted under 35 U.S.C. 154(b) by 29 days.

(21) Appl. No.: 18/883,848

(22) Filed: Sep. 12, 2024

(65) Prior Publication Data

US 2025/0001934 A1 Jan. 2, 2025

Related U.S. Application Data

(63) Continuation of application No. PCT/JP2023/005116, filed on Feb. 15, 2023.

(30) Foreign Application Priority Data

Mar. 15, 2022 (JP) ................................ 2022-040683
Feb. 10, 2023 (JP) ................................ 2023-019299

(51) Int. Cl.
*B60W 50/02* (2012.01)
*B60Q 9/00* (2006.01)
*B60W 50/029* (2012.01)
*H04W 4/44* (2018.01)

(52) U.S. Cl.
CPC ............... *B60W 50/02* (2013.01); *B60Q 9/00* (2013.01); *B60W 50/029* (2013.01); *H04W 4/44* (2018.02); *B60W 2556/45* (2020.02)

(58) Field of Classification Search
CPC ......... B60Q 9/00; B60W 50/00; B60W 50/02; B60W 50/082; B60W 50/085; B60W 50/14; B60W 50/029; B60W 60/00; B60W 60/0053; B60W 60/0057; B60W 60/0059; B60W 60/0061; G08G 1/16
See application file for complete search history.

(56) References Cited

U.S. PATENT DOCUMENTS

2017/0322558 A1 11/2017 Teshima et al.
2018/0170374 A1 6/2018 Otsuka et al.
2018/0356828 A1 12/2018 Teshima et al.
(Continued)

FOREIGN PATENT DOCUMENTS

JP 2018-24291 A 2/2018
JP 2019-172180 A 10/2019
WO 2021/149560 A1 7/2021

*Primary Examiner* — Van T Trieu
(74) *Attorney, Agent, or Firm* — Precision Patents, P.C.

(57) ABSTRACT

A processing method, which is executed by a processor to perform a processing related to driving of a host moving object with a driving system, includes: determining driving recovery of the host moving object, which is a recovery from an emergency operation of the host moving object to a driving operation of the host moving object, when the emergency operation is performed by the driving system, and notifying an outside of the host moving object about the driving recovery of the host moving object. The method further includes determining whether the driving recovery of the host moving object is caused by a takeover by an operator of the host moving object or a transition of the driving system from the emergency operation.

13 Claims, 11 Drawing Sheets

(56) References Cited

U.S. PATENT DOCUMENTS

2020/0231087 A1 7/2020 Morimura et al.
2020/0231182 A1* 7/2020 Oba ..................... G05D 1/0061
2020/0283028 A1 9/2020 Oba
2020/0307646 A1 10/2020 Kato et al.
2021/0229598 A1 7/2021 Morimura et al.
2022/0009524 A1* 1/2022 Oba ...................... B60W 50/14
2023/0191987 A1 6/2023 Morimura et al.

* cited by examiner

DS
DRIVING SYSTEM
1
PROCESSING SYSTEM
MEMORY
10
PROCESSOR
12
ACTUATOR SYSTEM
4
SENSOR SYSTEM
5
EXTERNAL ENVIRONMENT SENSOR
50
INTERNAL ENVIRONMENT SENSOR
52
COMMUNICATION SYSTEM
6
MAP DB
7
INFORMATION IF SYSTEM
8
HMI DEVICE
80
EXTERNAL NOTIFICATION UNIT
82

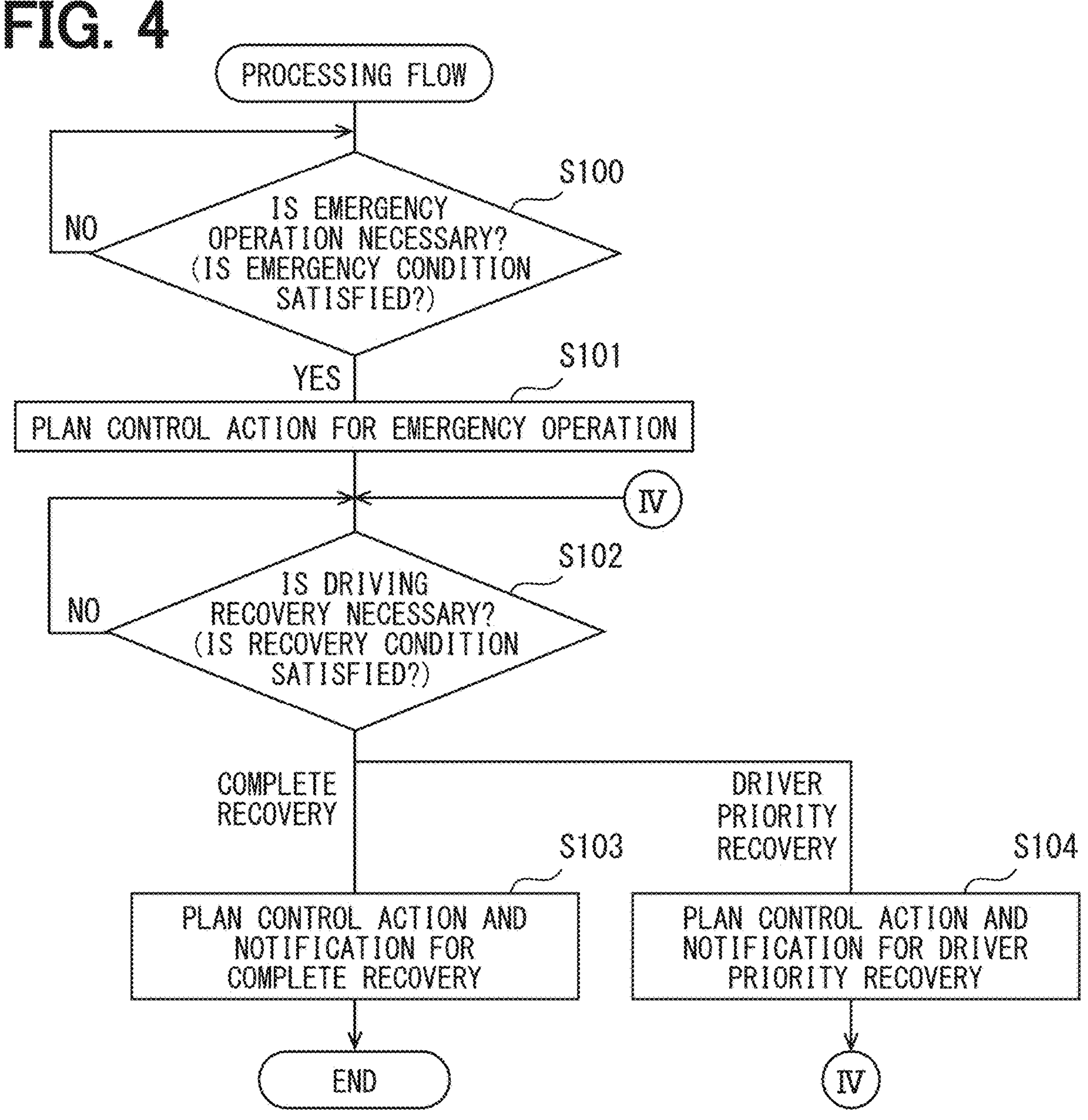
FIG. 4
PROCESSING FLOW
S100
IS EMERGENCY OPERATION NECESSARY? (IS EMERGENCY CONDITION SATISFIED?)
NO
YES
S101
PLAN CONTROL ACTION FOR EMERGENCY OPERATION
IV
S102
IS DRIVING RECOVERY NECESSARY? (IS RECOVERY CONDITION SATISFIED?)
NO
COMPLETE RECOVERY
DRIVER PRIORITY RECOVERY
S103
PLAN CONTROL ACTION AND NOTIFICATION FOR COMPLETE RECOVERY
S104
PLAN CONTROL ACTION AND NOTIFICATION FOR DRIVER PRIORITY RECOVERY
END
IV

FIG. 5

PROCESSING FLOW
S100
IS EMERGENCY OPERATION NECESSARY? (IS EMERGENCY CONDITION SATISFIED?)
NO
YES
S101
PLAN CONTROL ACTION FOR EMERGENCY OPERATION
VI
S302
IS DRIVING RECOVERY NECESSARY? (IS RECOVERY CONDITION SATISFIED?)
NO
DRIVER PRIORITY RECOVERY
S104
PLAN CONTROL ACTION AND NOTIFICATION FOR DRIVER PRIORITY RECOVERY
VI

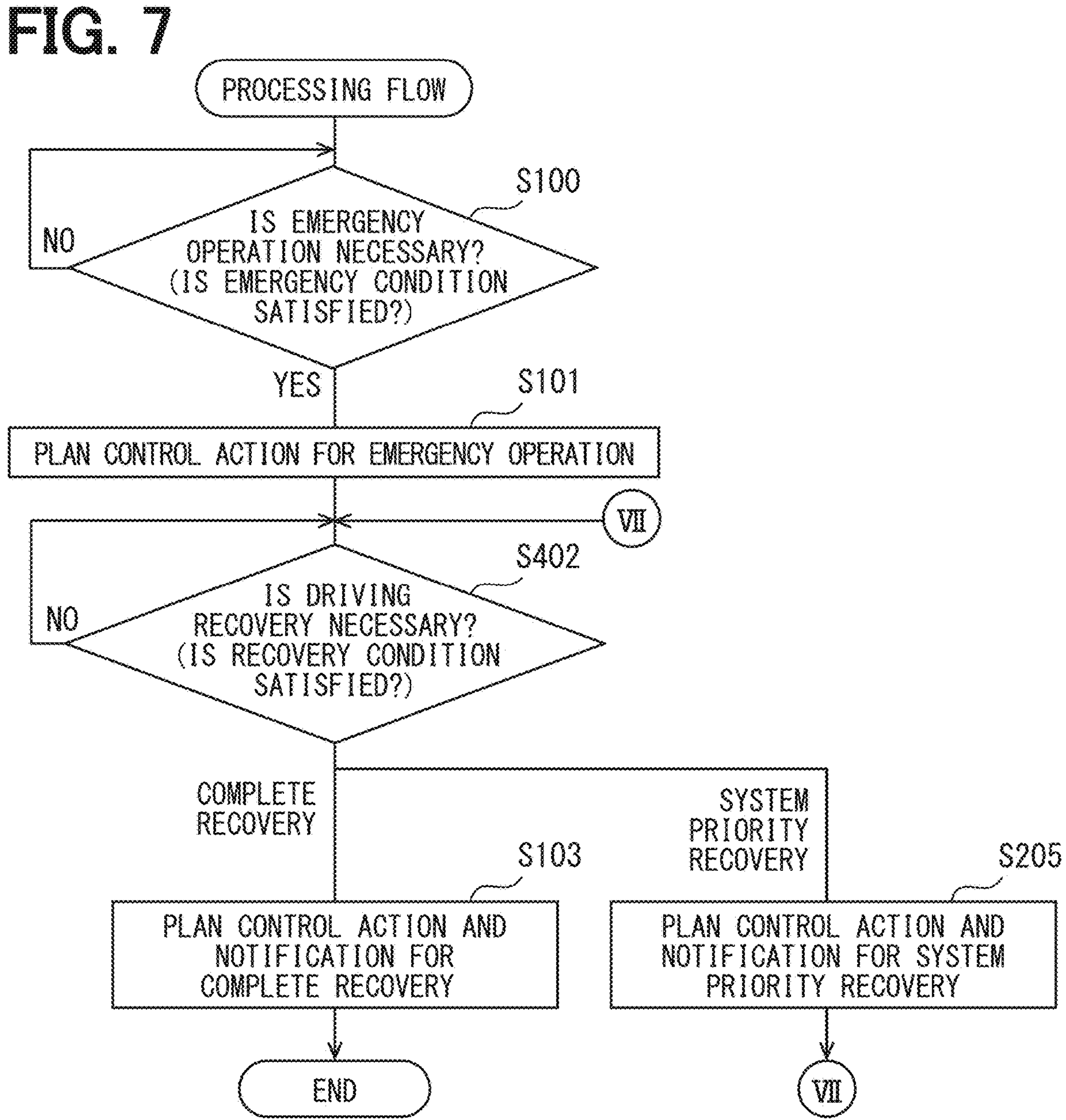
FIG. 7
PROCESSING FLOW
S100
IS EMERGENCY OPERATION NECESSARY? (IS EMERGENCY CONDITION SATISFIED?)
NO
YES
S101
PLAN CONTROL ACTION FOR EMERGENCY OPERATION
VII
S402
IS DRIVING RECOVERY NECESSARY? (IS RECOVERY CONDITION SATISFIED?)
NO
COMPLETE RECOVERY
SYSTEM PRIORITY RECOVERY
S103
PLAN CONTROL ACTION AND NOTIFICATION FOR COMPLETE RECOVERY
S205
PLAN CONTROL ACTION AND NOTIFICATION FOR SYSTEM PRIORITY RECOVERY
END
VII PROCESSING FLOW
S500
IS EMERGENCY OPERATION NECESSARY? (IS EMERGENCY CONDITION SATISFIED?)
NO
YES
S101
PLAN CONTROL ACTION FOR EMERGENCY OPERATION
S502
IS DRIVING RECOVERY NECESSARY? (IS RECOVERY CONDITION SATISFIED?)
NO
COMPLETE SYSTEM RECOVERY
S103
PLAN CONTROL ACTION AND NOTIFICATION FOR COMPLETE SYSTEM RECOVERY
END 9b, 9bc
3
3
3
2
3
9b, 9bs
9b, 9bd
BROKEN
CAR EXIST
9a

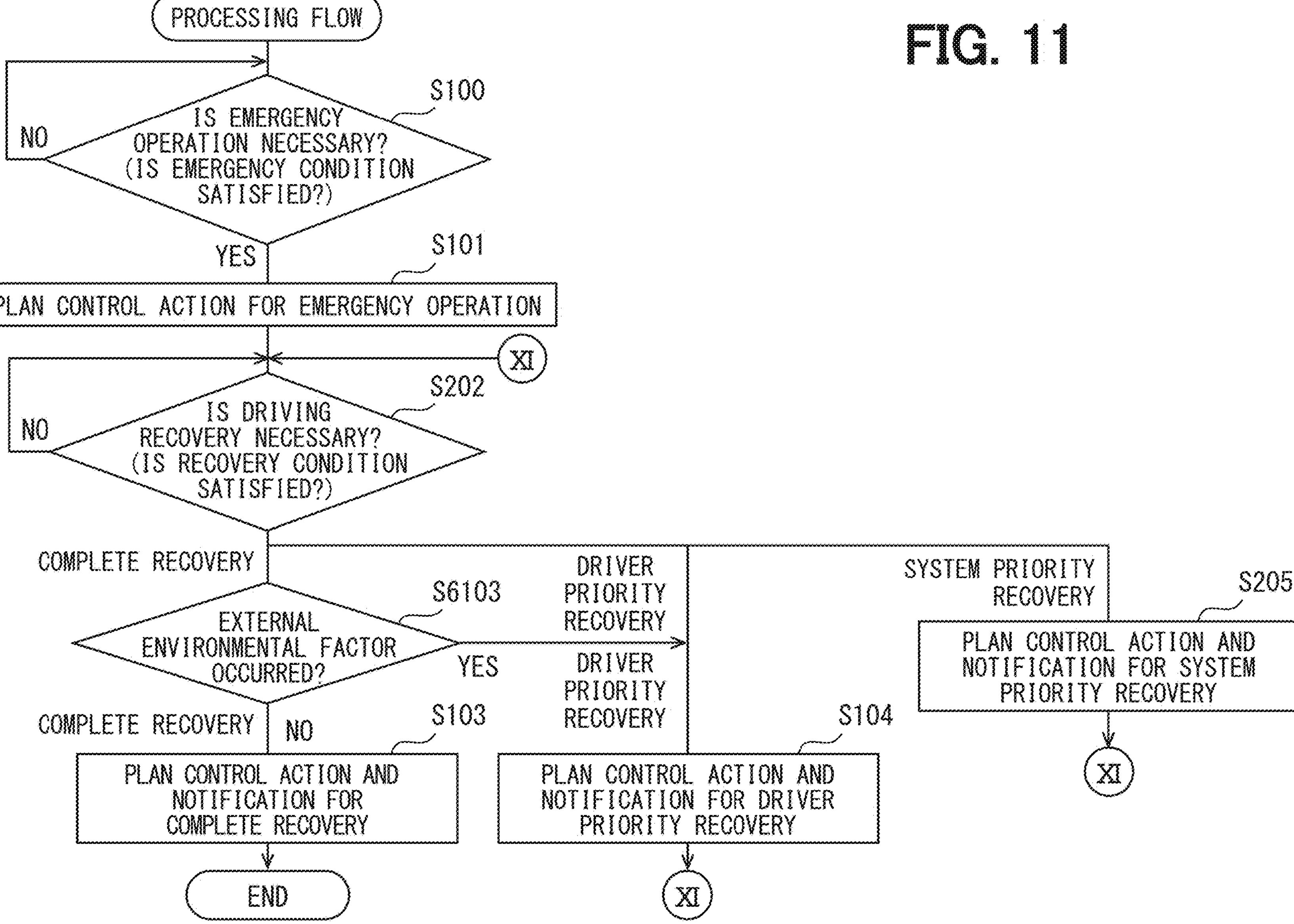
FIG. 11
PROCESSING FLOW
S100
IS EMERGENCY OPERATION NECESSARY? (IS EMERGENCY CONDITION SATISFIED?)
NO
YES
S101
PLAN CONTROL ACTION FOR EMERGENCY OPERATION
XI
S202
IS DRIVING RECOVERY NECESSARY? (IS RECOVERY CONDITION SATISFIED?)
NO
COMPLETE RECOVERY
DRIVER PRIORITY RECOVERY
SYSTEM PRIORITY RECOVERY
S6103
EXTERNAL ENVIRONMENTAL FACTOR OCCURRED?
YES
DRIVER PRIORITY RECOVERY
COMPLETE RECOVERY
NO
S103
PLAN CONTROL ACTION AND NOTIFICATION FOR COMPLETE RECOVERY
END
S104
PLAN CONTROL ACTION AND NOTIFICATION FOR DRIVER PRIORITY RECOVERY
XI
S205
PLAN CONTROL ACTION AND NOTIFICATION FOR SYSTEM PRIORITY RECOVERY
XI

PROCESSING METHOD, DRIVING SYSTEM, AND PROGRAM PRODUCT THEREOF

CROSS REFERENCE TO RELATED APPLICATIONS

The present application is a continuation application of International Patent Application No. PCT/JP2023/005116 filed on Feb. 15, 2023, which designated the U.S. and claims the benefit of priority from Japanese Patent Application No. 2022-40683 filed on Mar. 15, 2022, and Japanese Patent Application No. 2023-19299 filed on Feb. 10, 2023. The entire disclosures of all of the above applications are incorporated herein by reference.

TECHNICAL FIELD

The present disclosure relates to a technique for performing processing related to driving of a host moving object with a driving system.

BACKGROUND

According to a known driving assist system, when a cancel switch is pressed after a vehicle, which is also referred to as a host moving object, is stopped due to an emergency operation made by a driving system, the vehicle may resume the travel.

SUMMARY

A processing method, which is executed by a processor to perform a processing related to driving of a host moving object with a driving system, includes: determining driving recovery of the host moving object, which is a recovery from an emergency operation of the host moving object to a driving operation of the host moving object, when the emergency operation is performed by the driving system, and notifying an outside of the host moving object about the driving recovery of the host moving object. The method further includes determining whether the driving recovery of the host moving object is caused by a takeover by an operator of the host moving object or a transition of the driving system from the emergency operation.

BRIEF DESCRIPTION OF DRAWINGS

Objects, features and advantages of the present disclosure will become apparent from the following detailed description made with reference to the accompanying drawings. In the drawings:

FIG. 4 is a flowchart illustrating a processing flow according to the first embodiment;

FIG. 5 is a flowchart illustrating a processing flow according to a second embodiment;

FIG. 7 is a flowchart illustrating a processing flow according to a fourth embodiment;

FIG. 11 is a flowchart illustrating a processing flow according to a modification in which the sixth embodiment is applied to the second embodiment.

DETAILED DESCRIPTION

Figure 1:
FIG. 1 is a block diagram illustrating a physical architecture of a driving system according to a first embodiment.

In a known driving assist system, when a cancel switch is pressed after a vehicle is stopped due to an emergency operation made by a driving system, the vehicle may resume the travel. When the vehicle stopped by the emergency operation suddenly recovers and resumes the travel, it may be difficult for other road users other than the recovered vehicle to respond appropriately about the driving recovery of the vehicle.

According to a first aspect of the present disclosure, a processing method, which is executed by a processor to perform a processing related to driving of a host moving object with a driving system, includes: determining driving recovery of the host moving object, which is a recovery from an emergency operation of the host moving object to a driving operation of the host moving object, when the emergency operation is performed by the driving system, and notifying an outside of the host moving object about the driving recovery of the host moving object.

According to a second aspect of the present disclosure, a driving system includes a computer-readable non-transitory storage medium, and a processor, by executing a program stored in the computer-readable non-transitory storage, performing a processing related to driving of a host moving object. The process, by executing a program stored in the computer-readable non-transitory storage, is configured to: determine driving recovery of the host moving object, which is a recovery from an emergency operation of the host moving object to a driving operation of the host moving object, when the emergency operation is performed by the driving system, and notify an outside of the host moving object about the driving recovery of the host moving object.

According to a third aspect of the present disclosure, a processing program product stored in a computer-readable non-transitory storage medium is provided. The processing program product includes instructions to be executed by at least one processor for performing a processing related to driving of a host moving object with a driving system. The instructions includes: determining driving recovery of the host moving object, which is a recovery from an emergency operation of the host moving object to a driving operation of the host moving object, when the emergency operation is performed by the driving system, and notifying an outside of the host moving object about the driving recovery of the host moving object.

According to the first to third aspects, for the host moving object in which the emergency operation is performed by the driving system, driving recovery from the emergency operation is determined. Therefore, with the first to third aspects, the driving recovery of the host moving object is notified toward the outside of the host moving object. Thus, an other road user existing in an external environment of the host moving object that is notified of the driving recovery of the host moving object can take a response in accordance with the notification of the driving recovery of the host moving object in which the emergency operation has been performed. Therefore, it is possible to contribute to improvement in responsiveness of the other road user existing outside the host moving object.

Hereinafter, multiple embodiments of the present disclosure will be described based on the drawings. Duplicate description may be omitted by assigning the same reference numerals to the corresponding configuration elements in each embodiment. When only a part of the configuration is described in each embodiment, the configurations of the other embodiments described above can be applied to the other parts of the configuration. Not only the combinations of the configurations explicitly specified in the description of each embodiment, but also the configurations of the multiple embodiments can be partially combined even if they are not explicitly specified unless there is a particular problem with the combination.

First Embodiment

A driving system DS of the first embodiment illustrated in FIG. 1 is configured to include a processing system 1 in order to perform processing related to driving of a host moving object (hereinafter, referred to as a driving process). A part or all of the driving system DS are mounted on the host moving object.

Figure 2:
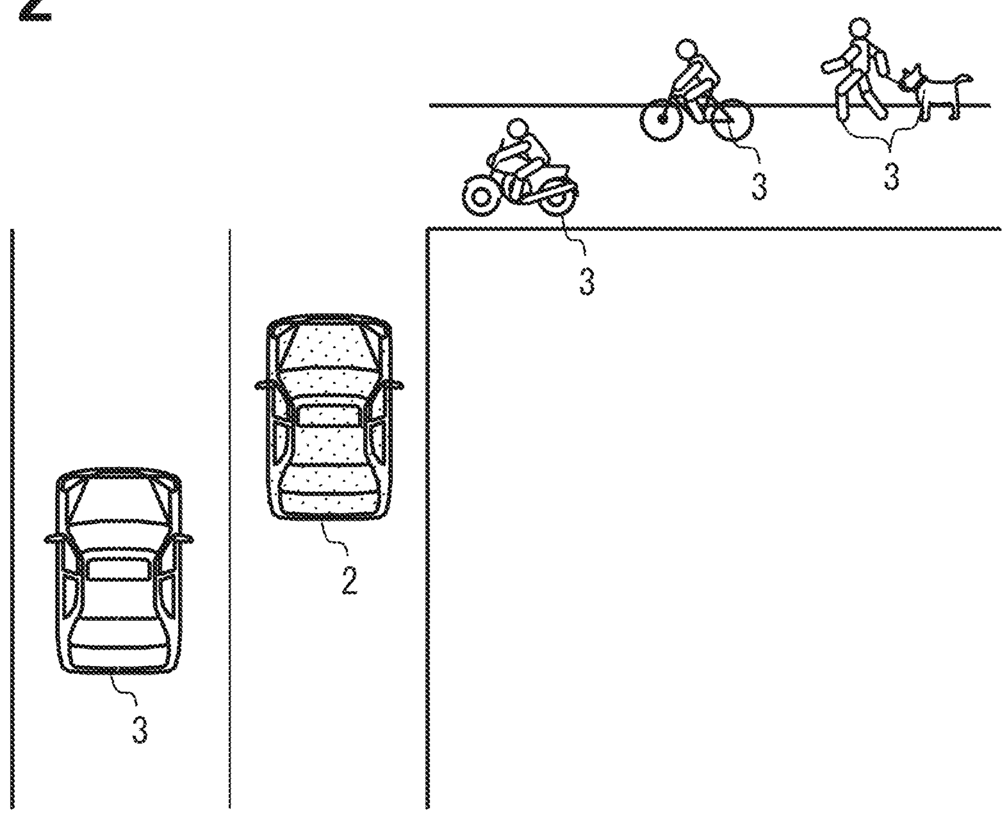
FIG. 2 is a schematic diagram illustrating a travel environment of a host vehicle to which the first embodiment is applied.

The host moving object as a target for a driving process in the driving system DS is a host vehicle 2 illustrated in FIG. 2. The host vehicle 2 is a road user capable of executing autonomous driving on, for example, a car, a truck, or the like. The host vehicle 2 may be referred to as a subject vehicle (ego-vehicle). Driving in the host vehicle 2 is divided into levels according to a range of a task performed by a driver who is an occupant in a driver's seat, among all dynamic driving tasks (DDTs). Here, the driver who can perform the DDT by a manual operation on the host vehicle 2 according to the levels of driving automation is a vehicle operator, and can also be said to be a vehicle user.

The levels of driving automation are defined by, for example, SAE J3016. Specifically, at levels 0 to 2, the driver performs a part or all of the DDT. Levels 0 to 2 may be classified as so-called manual driving. Level 0 indicates that driving is not automated. Level 1 indicates that the driving system DS supports the driver. Level 2 indicates that driving is partially automated. At level 3 or higher, while the driving system DS is engaged, the driving system DS performs the entire DDT. Levels 3 to 5 may be classified as so-called autonomous driving. The driving system DS capable of executing driving at level 3 or higher may be referred to as an automated driving system. Level 3 indicates that driving is conditionally automated. Level 4 indicates that driving is highly automated. Level 5 indicates that driving is fully automated. The driving system DS that cannot execute driving at level 3 or higher and can execute driving at at least one of levels 1 and 2 may be referred to as a driving support system. In the following description, it is assumed that an automated driving system or a driving support system is included in the driving system DS unless there is a circumstance that specifies the maximum achievable levels of driving automation.

An other road user 3 with respect to the host vehicle 2 is a road user other than the host vehicle 2, who exists in an external environment in which the host vehicle 2 travels. The other road user 3 includes, for example, non-vulnerable road users such as cars, trucks, motorcycles, and bicycles, and vulnerable road users such as pedestrians. The other road user 3 may further include animals.

In a physical architecture illustrated in FIG. 1, the driving system DS includes an actuator system 4, a sensor system 5, a communication system 6, a map database (DB) 7, an information interface (IF) system 8, and the processing system 1, as physical components. Meanwhile, the driving system DS may include at least the processing system 1 as its own physical components, and at least one type of physical components belonging to the actuator system 4, the sensor system 5, the communication system 6, the map DB 7, and the information IF system 8 may be replaced by a physical component belonging to the host vehicle 2.

The actuator system 4 is configured to be able to control driving of the host vehicle 2 based on an input control signal. The actuator system 4 may be at least one type of power train actuator of, for example, an internal combustion engine, a motor generator motor, and the like. The actuator system 4 may be at least one type of brake actuator of, for example, a brake unit and the like. The actuator system 4 may be at least one type of steering actuator of, for example, a power steering unit and the like.

The sensor system 5 acquires sensor data which is usable by the driving system DS by detecting an external environment and an internal environment of the host vehicle 2. For this purpose, the sensor system 5 includes an external environment sensor 50 and an internal environment sensor 52.

The external environment sensor 50 may detect a target object existing in the external environment of the host vehicle 2. The external environment sensor 50 having a target object detection type is at least one type of, for example, a camera, a light detection and ranging/laser imaging detection and ranging (LiDAR), a laser radar, a millimeter wave radar, an ultrasonic sonar, and the like. The external environment sensor 50 having the target object detection type is typically implemented in a combination of multiple types, for capable of sensing the host vehicle 2 in each direction of front, side, and rear. The external environment sensor 50 may detect an atmospheric condition in the external environment of the host vehicle 2. The external environment sensor 50 having an atmospheric detection type is at least one type of, for example, an outside air temperature sensor, a humidity sensor, and the like.

The internal environment sensor 52 may detect a specific physical quantity related to vehicle motion (hereinafter, referred to as kinematic properties) in the internal environment of the host vehicle 2. The internal environment sensor 52 having kinematic properties detection type is at least one type of, for example, a speed sensor, an acceleration sensor, a gyro sensor, and the like. The internal environment sensor 52 may detect a state of an occupant in the internal environment of the host vehicle 2. The internal environment sensor 52 having an occupant detection type is at least one type of, for example, an actuator sensor, a driver status monitor (registered trademark), a biological sensor, a seating sensor, an in-vehicle device sensor, and the like. Here, examples of the actuator sensor include at least one type of, for example, a starting switch, an accelerator sensor, a brake sensor, a steering sensor, and the like, which detects an operating state of an occupant regarding the actuator system 4 of the host vehicle 2.

The communication system 6 acquires communication data that can be used in the driving system DS by wireless communication. The communication system 6 may receive a positioning signal from an artificial satellite of a global navigation satellite system (GNSS) existing in the external environment of the host vehicle 2. The communication system 6 having a positioning type is, for example, a GNSS receiver or the like. The communication system 6 may transmit and receive communication signals to and from a V2X system existing in the external environment of the host vehicle 2. The communication system 6 having a V2X type is at least one type of, for example, a dedicated short range communications (DSRC) communication device, a cellular V2X (C-V2X) communication device, and the like. Here, examples of communication with the V2X system include at least one type of communication with a communication system of an other vehicle that is the other road user 3 (V2V), communication with infrastructure equipment such as a communication device installed at a traffic light (V2I), communication with a mobile terminal of a pedestrian who is the other road user 3 (V2P), communication with a cloud network or mesh network (V2N), and the like. The communication system 6 may transmit and receive communication signals to and from a mobile terminal existing in the internal environment of the host vehicle 2. The communication system 6 having a terminal communication type is at least one type of, for example, Bluetooth (registered trademark) device, Wi-Fi (registered trademark) device, infrared communication device, and the like.

The map DB 7 stores map data that can be used by the driving system DS. The map DB 7 includes at least one type of non-transitory tangible storage medium of, for example, a semiconductor memory, a magnetic medium, an optical medium, and the like. The map DB 7 may be a DB of a locator for estimating a self-state amount of the host vehicle 2 including its own position. The map DB may be a DB of a navigation unit that navigates a travel path of the host vehicle 2. The map DB 7 may be constructed by a combination of multiple types of DBs.

The map DB 7 acquires and stores the latest map data through communication and the like with an external center via the V2X type communication system 6, for example. The map data is two-dimensional or three-dimensional data as data representing a travel environment of the host vehicle 2. Digital data of a high definition map may be adopted as the three-dimensional map data. The map data may include road data representing at least one type of, for example, a positional coordinate, a shape, a road surface condition, and the like of a road structure. The map data may include marking data representing at least one type of, for example, a traffic sign, a road display, a positional coordinate and a shape of a lane marking, and the like attached to a road. The marking data included in the map data may represent, for example, a traffic-control sign, an arrow marking, a lane marking, a stop line, a direction sign, a landmarking beacon, a rectangular sign, a business sign, a line pattern change of a road, and the like among landmarks. The map data may include structure data representing at least one type of positional coordinates, a shape, and the like of a building and a traffic light facing the road, for example. The marking data included in the map data may represent landmarks such as a street light, an edge of a road, a reflecting plate, a pole, or a back side of a traffic sign, for example.

The information IF system 8 mediates transmission of notification information related to a driving process between an occupant including a driver of the host vehicle 2, and the driving system DS. For this purpose, the information IF system 8 includes a human machine interface (HMI) device 80.

The HMI device 80 may be configured to be able to detect an operation for inputting an intention of the occupant in the host vehicle 2 to the driving system DS. The HMI device 80 having an operation detection type is at least one type of, for example, push switch, lever switch, touch panel, and the like. The HMI device 80 having the operation detection type may be replaced by an actuator sensor or the like as the internal environment sensor 52 of the sensor system 5. The HMI device 80 may be configured to be able to detect a gesture for inputting an intention of the occupant in the host vehicle 2 to the driving system DS. The HMI device 80 having a gesture detection type may be replaced by a driver status monitor or the like as the internal environment sensor 52 of the sensor system 5.

The HMI device 80 may present notification information by stimulating a visual sense of the occupant in the host vehicle 2. The HMI device 80 having a visual information presentation type is at least one type of, for example, a head-up display (HUD), a center information display (CID), a multi function display (MFD), a combination meter, a navigation unit, an illumination unit, and the like. The HMI device 80 may present notification information by stimulating an auditory sense of the occupant. The HMI device 80 having an auditory information presentation type is at least one type of, for example, a speaker, a buzzer, a vibration unit, and the like. The HMI device 80 may present notification information by stimulating a skin sensation of the occupant. The HMI device 80 having a skin sensory information presentation type is at least one type of, for example, a steering wheel vibration unit, a vibration unit of a driver's seat, a steering wheel reaction force unit, an accelerator pedal reaction force unit, a brake pedal reaction force unit, and an air conditioning unit.

The information IF system 8 mediates transmission of notification information related to a driving process between the other road user 3 existing outside the host vehicle 2 and the driving system DS. For this purpose, the information IF system 8 includes an external notification unit 82.

The external notification unit 82 may present the notification information by stimulating a visual sense of a person such as a pedestrian as the other road user 3 or a person riding in an other vehicle as the other road user 3 in the external environment of the host vehicle 2. The external notification unit 82 having a visual information presentation type is at least one type of, for example, a hazard flasher, a direction indicator lamp, an illumination light, a projection light, an electronic sticker, an external display unit, and the like. Here, the electronic sticker serving as the external notification unit 82 may be, for example, an autonomous-driving-dedicated sticker or the like indicating that the host vehicle 2 is an autonomous driving car or is in autonomous driving. The external notification unit 82 receives the notification information by stimulating an auditory sense of a person such as a pedestrian as the other road user 3 or a person riding in an other vehicle as the other road user 3 in the external environment of the host vehicle 2. The external notification unit 82 having an auditory information presentation type is at least one type of, for example, an electronic horn, a speaker, a buzzer, and the like.

The processing system 1 is connected to the actuator system 4, the sensor system 5, the communication system 6, the map DB 7, and the information IF system 8 via at least one type of, for example, a local area network (LAN), a wire harness, an internal bus, a wireless communication line, and the like. The processing system 1 includes at least one dedicated computer.

The dedicated computer constituting the processing system 1 may be an integrated electronic control unit (integrated ECU) that integrates driving control of the host vehicle 2. The dedicated computer constituting the processing system 1 may be a detection ECU that processes sensor data detected in the driving control of the host vehicle 2. The dedicated computer constituting the processing system 1 may be a perception ECU that performs perception on the driving control of the host vehicle 2. The dedicated computer constituting the processing system 1 may be a determination ECU that determines and plans the DDT in the driving control of the host vehicle 2. The dedicated computer constituting the processing system 1 may be a monitoring ECU that monitors the driving control of the host vehicle 2. The dedicated computer constituting the processing system 1 may be an evaluation ECU that evaluates the driving control of the host vehicle 2.

The dedicated computer constituting the processing system 1 may be a navigation ECU that navigates a travel path of the host vehicle 2. The dedicated computer constituting the processing system 1 may be a locator ECU that estimates a self-state amount including a self-position of the host vehicle 2. The dedicated computer constituting the processing system 1 may be an actuator ECU that controls the actuator system 4. The dedicated computer constituting the processing system 1 may be an HMI control unit (HCU) that controls the HMI device 80. The dedicated computer constituting the processing system 1 may be a storage ECU that controls storing of data. The dedicated computer constituting the processing system 1 may be at least one external computer that constructs an external center or a mobile terminal which is communicable via, for example, the communication system 6.

The dedicated computer constituting the processing system 1 includes at least one memory 10 and at least one processor 12. The memory 10 is at least one type of non-transitory tangible storage medium of, for example, a semiconductor memory, a magnetic medium, and an optical medium, for non-transitory storage of computer readable programs, data, and the like. The processor 12 includes, as a core, at least one type of, for example, a central processing unit (CPU), a graphics processing unit (GPU), a reduced instruction set computer (RISC)-CPU, and the like.

The memory 10 may be an accumulation device that selects at least one type of perception information, determination information, monitoring information, and control information in the driving system DS, and accumulates the data. The memory 10 may be a volatile storage medium such as a random access memory (RAM) that temporarily stores at least one type of the perception information, the determination information, the monitoring information, and the control information in the driving system DS. The memory 10 may be a database for executing the DDT in the driving system DS.

The memory 10 may be mounted on a substrate in a non-removable and non-replaceable manner, and this configuration includes an embedded multi media card (eMMC) using a flash memory, for example. The memory 10 may be configured to be removable and replaceable, and this configuration includes, for example, an SD card. The memory 10 may be implemented as a dedicated computer that constitutes the processing system 1 by a system on a chip (SoC) that is integrated into one chip along with the processor 12 and an input and output IF.

Figure 3:
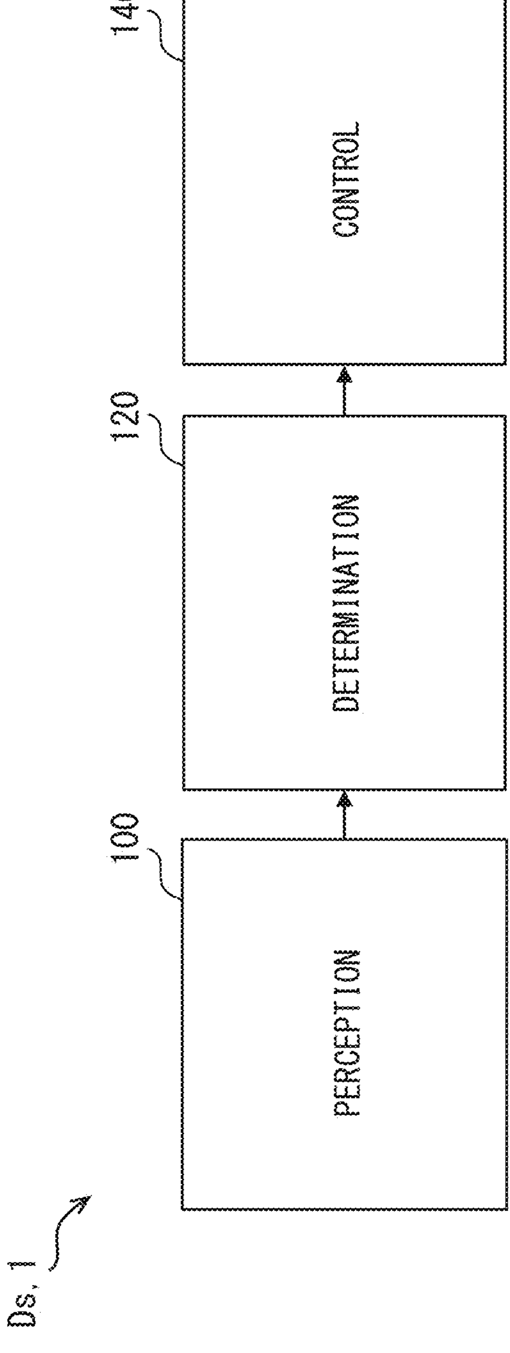
FIG. 3 is a block diagram illustrating a functional architecture of the driving system according to the first embodiment.

The processor 12 executes multiple instructions included in a processing program stored in the memory 10 as software. Accordingly, the driving system DS including the processing system 1 constructs multiple functional blocks for performing a driving process of the host vehicle 2. In this manner, in the driving system DS, in order to perform a driving process for the host vehicle 2 with the processing system 1 as a main body, the processing program stored in the memory 10 causes the processor 12 to execute the multiple instructions, so that the multiple functional blocks are constructed. The multiple functional blocks thus constructed in the driving system DS include a perception block 100, a determination block 120, and a control block 140, which are illustrated as a functional architecture in FIG. 3.

The perception block 100 acquires sensor data from the sensor system 5. The perception block 100 acquires communication data from the communication system 6. The perception block 100 acquires map data from the map DB 7. The perception block 100 perceives internal and external environments of the host vehicle 2 by individually processing and then fusing these pieces of acquired data. In generating of perception information, the perception block 100 acquires data from the sensor system 5, the communication system 6, and the map DB 7, understands and grasps a meaning of the acquired data, and perceives a general situation including the external environment of the host vehicle 2 and a situation in which the host vehicle 2 is placed in the external environment, and the internal environment of the host vehicle 2, by the fusion of the acquired data. By perceiving the internal and external environments, the perception block 100 generates perception information to be provided to the determination block 120.

The perception information generated by the perception block 100 describes a state detected for each scene in the travel environment of the host vehicle 2. The perception block 100 may generate perception information on an object including the other road user 3, an obstacle, and a structure in the external environment of the host vehicle 2, by detecting (sensing) the object. The perception information on the object may represent at least one type of, for example, a separation distance, a movement direction, a relative speed, a relative acceleration, a size, an estimated state based on tracking detection, and the like. The perception information on the object may represent a classification of the object, which is perceived based on a state of the object clustered by, for example, semantic segmentation. By detecting a traveling path for current and future traveling of the host vehicle 2, the perception block 100 may generate perception information on the traveling path. The perception information on the traveling path may represent at least one type of static structure, among, for example, a road surface, a lane, a road edge, a free space, and the like.

By localization of presumptively perceiving a self-state amount including a self-position of the host vehicle 2, the perception block 100 may generate perception information on the self-state amount. The perception block 100 may generate update data of map data regarding a traveling path of the host vehicle 2 at the same time as the perception information on the self-state amount, and may feedback the update data to the map DB 7. By detecting a marking associated with the traveling path of the host vehicle 2, the perception block 100 may generate perception information on the marking. The perception information on the marking may represent a state of at least one type of, for example, a sign, a lane marking, a traffic light, and the like. The perception information on the marking may further represent a traffic rule perceived or specified from the state of the marking. By detecting a weather situation for each scene in which the host vehicle 2 is traveling, the perception block 100 may generate perception information on the weather situation. By detecting a time for each scene in which the host vehicle 2 is traveling, the perception block 100 may generate perception information on the time.

The determination block 120 acquires perception information from the perception block 100. The determination block 120 predicts a future action of the other road user 3 with respect to the host vehicle 2 in time series, based on the acquired perception information. The predicted future action may include a risky action of the other road user 3 of which a potential risk with the host vehicle 2 can be predicted. The predicted future action may be a future trajectory of the other road user 3. Here, the future trajectory may be predicted such that at least one type of kinematic properties regarding the other road user 3 among, for example, a position, a speed, an acceleration, a yaw rate, a movement direction, and the like is defined in time series.

The determination block 120 may interpret a travel environment in which the host vehicle 2 is placed as a basic process for predicting the future action of the other road user 3. At this time, the determination block 120 may interpret an intention and an action based on classification of the other road user 3 who is a dynamic object, or may interpret a driving situation that can be classified. Here, the interpretation on the intention and the action of the other road user 3 may be, for example, an interpretation of a lane change probability or the like. The interpretation on the driving situation is, for example, an interpretation on traffic rules, traffic congestion situation, and the like. By the perception block 100 executing at least a part of the environment interpretation that is the basis of such an action prediction, an interpretation result as the perception information may be provided to the determination block 120.

The determination block 120 plans a route for the host vehicle 2 to travel in the future by driving control. That is, the determination block 120 implements a DDT function of planning a route as a strategic function of the host vehicle 2. The determination block 120 may plan at least one type of a route and a lane to a destination based on perception information for estimating a self-position of the host vehicle 2. At this time, the determination block 120 may plan at least one type of a lane change request and a deceleration request based on the planned lane.

The determination block 120 plans a future action of the host vehicle 2 based on the planned route and lanes as well as the predicted future behavior of the other road user 3. That is, the determination block 120 implements a DDT function of planning a tactical behavior of the host vehicle 2. The behavior planning function of the determination block 120 may include a function of generating a transition condition regarding a state transition of the host vehicle 2. The transition condition regarding the state transition of the host vehicle 2 may correspond to a triggering condition. Therefore, the behavior planning function may include a function of determining the state transition of an application of implementing the DDT, and further the state transition of the driving action, based on the generated transition condition.

The determination block 120 plans the future trajectory to be given to the host vehicle 2 along the planned route based on the predicted future action of the other road user 3. That is, the determination block 120 implements a DDT function of planning a future trajectory for the host vehicle 2 to travel as a path plan. The future trajectory planned by the determination block 120 may define at least one type of kinematic properties regarding the host vehicle 2 of, for example, a position, a speed, an acceleration, a yaw rate, a movement direction, and the like, in time series. The defined time series trajectory plan will construct a scenario for a future travel by navigating of the host vehicle 2. Therefore, the trajectory plan may include a function of selecting or switching an optimum path plan among multiple path plans.

The determination block 120 may determine a transition of a driving mode by the driving system DS according to the driver's intention based on at least one type of, for example, intention estimation information and biometric information as perception information regarding the driver by the perception block 100. The determination block 120 may determine whether the driver has a failure based on at least one type of, for example, intention estimation information and biometric information as the perception information regarding the driver by the perception block 100. The determination block 120 may determine whether there is a failure in each of the physical components 1 and 4 to 8 by monitoring the driving system DS. The determination block 120 may set a constraint on a function related to the driving of the host vehicle 2, based on at least one type of the driving mode transition determination result, the driver failure determination result, the failure determination result of the driving system DS, the future route planning result, the future behavior planning result, the future trajectory planning result, and the like.

The determination block 120 may plan adjustment of the levels of driving automation in the host vehicle 2. The adjustment of the levels of driving automation may include a takeover/handover of the DDT between the driving system DS and the driver, by the transition of the driving mode between autonomous driving and manual driving. The takeover/handover between the autonomous driving and the manual driving may be implemented by setting an operational design domain (ODD) in which autonomous driving is executed, in a scenario accompanying entry into or exit from the ODD. For example, in an exit scenario from ODD, that is, a takeover/handover scenario from the autonomous driving to the manual driving, an unreasonable situation in which it is determined that an unreasonable risk exists can be cited as a use case. In this use case, the determination block 120 may plan a DDT fallback for the driver who becomes a fallback ready user to transit the host vehicle 2 to a minimal risk condition (MRC) by the manual driving.

The adjustment of the levels of driving automation planned by the determination block 120 may include degradation driving of the host vehicle 2. In a scenario of the degradation driving, a use case is an unreasonable situation in which it is determined that an unreasonable risk exists in takeover/handover to manual driving. In this use case, the determination block 120 may plan a best effort to transition the host vehicle 2 to the MRC by autonomous driving and autonomous stopping to minimize a harm or a risk of an accident. In addition to the adjustment of lowering the levels of driving automation, in such best efforts, an emergency manoeuvre/emergency operation may be planned, such as DDT fallback or minimum risk manoeuvre (MRM) to reach the MRC as a safe state, for example, as adjustment of maintaining the levels of driving automation. At this time, a notification accompanying the emergency operation may be planned to make the transition to the MRC more conspicuous both inside and outside the host vehicle 2, by at least one type using the information IF system 8 or the communication system 6 of, for example, various sensory stimulations, communication, and the like.

The determination block 120 further plans driving control of the host vehicle 2 according to at least the route plan, the behavior plan, the trajectory plan, and the driving level plan, among the plans described above. In the driving control planning, a control command regarding a navigation operation of the host vehicle 2 and a support operation of the driver is generated as a control action. That is, the determination block 120 implements a DDT function of planning a control action that is a motion control request of the host vehicle 2. The control command generated by the determination block 120 may include a control parameter for controlling the actuator system 4. Such control planning may be performed by the control block 140, prior to driving control which will be described below.

In the control planning, by using the safety model described according to a driving policy and its safety, the determination block 120 may plan the control action in accordance with the driving policy. Here, the driving policy following the safety model is defined based on a vehicle level SOTIF strategy (VLSS) that guarantees a safety of the intended functionality (SOTIF). In other words, the safety model is described by following the driving policy that is implementation of the VLSS and by modeling the SOTIF.

The safety model may be defined as safety-related models that represent safety-related aspects of driving action based on assumptions about the reasonably foreseeable action of the other road user 3, and may be defined in a model constituting a part of the safety-related model. Such a safety model may be constructed in a form of at least one type of, for example, a mathematical model obtained by formulating a vehicle level safety, a computer program for executing a process according to the mathematical model, and the like. The determination block 120 may train the safety model with a machine learning algorithm that back-propagates driving control results to the safety model by the subsequent control block 140. As the safety model to be trained, at least one type of learning model may be used among deep learning by a neural network such as deep neural network (DNN), reinforcement learning, and the like, for example.

The control block 140 acquires the control command from the determination block 120. The control block 140 controls driving of the host vehicle 2 according to the planned control command. That is, the control block 140 implements a DDT function of giving a control action to the host vehicle 2. At this time, for example, by obtaining perception information such as vehicle motion, regarding the host vehicle 2 from the perception block 100 or via the determination block 120, the control block 140 may use the perception information for the vehicle control. When a notification is planned by the determination block 120, by controlling at least one of the information IF system 8 and the communication system 6, the control block 140 may further output the notification.

In the first embodiment, a flow of a processing method (hereinafter, referred to as a processing flow) for performing a driving process of the host vehicle 2 according to a flowchart illustrated in FIG. 4 is repeatedly executed by the cooperation of multiple blocks 100, 120, and 140. Here, the processing flow of the first embodiment is started, for example, in a situation or the like in which the host vehicle 2 is controlled in an autonomous driving state at level 3 by the driving system DS, for example. In the following description, each “S” in the processing flow means multiple steps executed by multiple instructions included in a processing program.

In S100, the determination block 120 determines whether an emergency operation is necessary to cause the host vehicle 2 in a nominal state to transition to an MRC by the driving system DS. At this time, the determination block 120 monitors whether an emergency condition is satisfied as a triggering condition for the emergency operation. Here, the nominal state may be defined as a state in which the host vehicle 2 is released from a fault, a malfunction, a potentially hazardous behavior, or the like, and is nominally operated by the driving system DS. In other words, the emergency condition may be defined as a condition that requires execution of an emergency operation in the host vehicle 2, due to a failure, a malfunction, a potentially hazardous behavior, or the like.

Specifically, the emergency condition determined by S100 is satisfied when a failure occurs in at least one type of a physical element or a functional block in the driving system DS, and a failure occurs in takeover/handover of the DDT to the driver. Here, the failure of the physical element in the driving system DS may be a malfunction, such as a decrease in detection range or field of view of the external environment sensor 50 included in the sensor system 5, for example. The failure of the functional block in the driving system DS may be a malfunction, such as a decrease in perception range by the perception block 100, for example. The failure in takeover/handover may be a malfunction when the driver’s takeover/handover intention is not detected within a specific time frame by, for example, the HMI device 80 or the internal environment sensor 52, for a takeover/handover request that is notified to the driver by the HMI device 80 in response to the failure occurrence in physical element or functional block. The failure in takeover/handover may be a malfunction when in response to the failure occurrence in physical element or functional block, the HMI device 80 or the internal environment sensor 52 detects the driver’s biological state which is unsuitable for takeover/handover regarding at least one type of, for example, a posture, a sight line, consciousness, and the like. Examples of the biological state which is unsuitable for such takeover/handover include an inattentive behavior in which the sight line of the driver deviates from a traveling direction of the host vehicle 2.

When the emergency condition is satisfied in S100, the processing flow proceeds to S101. In S101, the determination block 120 plans a control action to perform an emergency operation for a transition to the MRC. At this time, the control action for performing the emergency operation is at least one type of a proper response or a fault reaction of, for example, deceleration within the lane, emergency stop within the lane, autonomous stop after autonomous driving within the lane, escape from the lane, and the like. In S101, the control block 140 provides the control action of the emergency operation planned by the determination block 120 to the host vehicle 2.

In S101, the determination block 120 may further plan a notification of the emergency operation in accordance with the planned control action. The notification plan at this time may include generation of notification data for notifying the driver in the host vehicle 2 of the emergency operation from the HMI device 80 of the information IF system 8. The notification plan may include generation of notification data for notifying people outside the host vehicle 2 of the emergency operation from the external notification unit 82 of the information IF system 8. The notification plan may include generation of notification data to be transmitted from the communication system 6 to the outside of the host vehicle 2, for example, by broadcasting or the like to notify an external center of the emergency operation. In S101, the control block 140 causes the host vehicle 2 to output the notification data of the emergency operation planned by the determination block 120.

In S102 following S101, the determination block 120 determines whether driving recovery from the emergency operation of the host vehicle 2 on which the emergency operation is performed by the driving system DS is necessary. At this time, the determination block 120 monitors whether a recovery condition is satisfied in which at least a portion of the emergency condition is to be resolved. Specifically, in the first embodiment, the driving recovery determined in S102 uses at least the resolution of the failure in takeover/handover of the DDT to the driver as a triggering condition. That is, the recovery condition determined in S102 includes a complete recovery condition that is satisfied when each failure in driving system DS and takeover/handover is resolved, and a driver priority recovery condition that is satisfied when the failure in driving system DS is continued and the failure in takeover/handover to the driver is resolved.

Here, the resolution of the failure in the driving system DS may be determined by the recovery of all the capabilities or functions of the driving system DS. The resolution of the failure in takeover/handover may be determined by, for example, detecting the biological state of the driver suitable for takeover/handover, such as a posture, a sight line, or consciousness, by the HMI device 80 or the internal environment sensor 52. The resolution of the failure in takeover/handover may be determined by, for example, detecting the takeover/handover intention of the driver within a specific time frame by the HMI device 80 or the internal environment sensor 52, in response to a takeover/handover request notified to the driver by the HMI device 80.

After the host vehicle 2 is stopped according to the control action in S101, a case is assumed in which a starting switch of the host vehicle 2 is turned off by the driver or the driving system DS (for example, the determination block 120 or the like). Although illustration is omitted, a state of the starting switch is monitored at each start timing of S102, so that the current execution of the processing flow is completed in response to turning off the starting switch.

In S102, when the complete recovery condition is satisfied in which the respective failures in driving system DS and in takeover/handover are both to be resolved, the processing flow proceeds to S103. In S103, by determining complete recovery to recover the driving system DS to the nominal state as the driving recovery of the host vehicle 2 on which the emergency operation is performed by the driving system DS, the determination block 120 plans a control action for the complete recovery. That is, in the first embodiment, the nominal state is a recovered state in which the driving system DS is transitioned from the state of the emergency operation. Accordingly, in S103, the control block 140 causes the host vehicle 2 to perform the driving recovery to the nominal state of the driving system DS by the control action planned by the determination block 120.

In S103, the determination block 120 further plans a notification of complete recovery in which autonomous driving in the nominal state is resumed by the driving system DS, in accordance with the driving recovery by the planned control action. The notification plan at this time may include generation of notification data for notifying the driver in the host vehicle 2 of the complete recovery from the HMI device 80 of the information IF system 8. The notification plan may include generation of notification data for notifying people outside the host vehicle 2 of the complete recovery from the external notification unit 82 of the information IF system 8. The notification plan may include generation of notification data to be transmitted from the communication system 6 to the outside of the host vehicle 2, for example, by broadcasting or the like, to notify the external center of the complete recovery. The notification plan may include generation of notification data to be transmitted from the communication system 6 to the outside of the host vehicle 2, for example, by broadcasting or the like, to notify the mobile terminal of the other road user 3, of the complete recovery. In S103, the control block 140 causes the host vehicle 2 to output the notification data of the complete recovery planned by the determination block 120.

Here, the notification of the complete recovery to the outside of the host vehicle 2 may be executed in response to the determination block 120 generating notification data that is output in a visually stimulable manner. At this time, a notification of the complete recovery using visual stimulation may be implemented by blinking of the external notification unit 82 such as a hazard flasher, for example. The notification of the complete recovery to the outside of the host vehicle 2 may be executed in response to the determination block 120 generating notification data that is output in an audibly stimulable manner. At this time, the notification of the complete recovery by auditory stimulation may be implemented by operating of the external notification unit 82 such as an electronic horn, for example. In both cases of visual stimulation and auditory stimulation, the notification of the complete recovery may be made toward the outside of the host vehicle 2, for example, toward the rear, with a directivity toward the other road user 3 who requires the notification.

On the other hand, in S102, if the driver priority recovery condition is satisfied in which the failure in driving system DS is to be continued and the failure in takeover/handover to the driver is to be resolved, the processing flow proceeds to S104. In S104, by determining driver priority recovery for prioritizes takeover/handover of the DDT to the driver as the driving recovery of the host vehicle 2 by the emergency operation by the driving system DS, the determination block 120 plans a control action for the driver priority recovery. At this time, the control action for the driver priority recovery may be notifying the driver of a takeover/handover request by the HMI device 80, and maintaining the emergency operation by the actuator system 4 until at least the HMI device 80 detects the takeover/handover intention of the driver. The control action for the driver priority recovery may be maintaining the manual driving state by the driver after takeover/handover of the DDT when the takeover/handover intention of the driver is already detected or after the takeover/handover intention of the driver is detected. In S104, the control block 140 causes the host vehicle 2 to perform the takeover/handover driving recovery of the DDT to the driver by the control action planned by the determination block 120.

In S104, the determination block 120 further plans a notification of the driver priority recovery in which manual driving is started by the driver after the takeover/handover of the DDT, in accordance with the driving recovery by the planned control action. The notification plan at this time may include generation of notification data for notifying a person outside the host vehicle 2 from the external notification unit 82 in the information IF system 8 of the driver priority recovery. The notification plan may include generation of notification data to be transmitted from the communication system 6 to the outside of the host vehicle 2, for example, by broadcasting or the like, to notify the external center of the driver priority recovery. The notification plan may include generation of notification data to be transmitted from the communication system 6 to the outside of the host vehicle 2, for example, by broadcasting or the like, to notify the mobile terminal of the other road user 3, of the driver priority recovery. In S104, the control block 140 causes the host vehicle 2 to output the notification data of the driver priority recovery planned by the determination block 120.

Here, the notification of the driver priority recovery to the outside of the host vehicle 2 may be executed in response to the determination block 120 generating notification data that is output in a visually stimulable manner. At this time, the notification of the driver priority recovery using visual stimulation may be implemented by setting a blinking pattern of the external notification unit 82 such as a hazard flasher, for example, as a different pattern in a case of the complete recovery or a common pattern. The notification of the driver priority recovery to the outside of the host vehicle 2 may be executed in response to the determination block 120 generating notification data that is output in an audibly stimulable manner. At this time, the notification of the driver priority recovery using auditory stimulation may be implemented by setting an operation pattern of the external notification unit 82 such as an electronic horn, for example, as a different pattern in a case of the complete recovery or a common pattern in the case. In both cases of visual stimulation and auditory stimulation, the notification of the driver priority recovery may be made toward the outside of the host vehicle 2, for example, toward the rear, with a directivity toward the other road user 3 who requires the notification.

In the above, when the execution of S103 is completed, the current execution of the processing flow ends. On the other hand, when the execution of S104 is completed, the processing flow returns to S102 such that the control on the driving recovery is continued until the complete recovery. Meanwhile, in S104 that is repeated after returning from S104 to S102, when a time passing since the execution of S104, which is a first step in the repetition, exceeds a set time or is equal to or more than the set time, the planning and execution of the notification may be omitted. Further, in S103 in a case where the complete recovery condition is satisfied after returning from S104 to S102, the planning and execution of the notification may be omitted.

In the first embodiment described so far, for the host vehicle 2 on which an emergency operation is performed by the driving system DS, driving recovery from the emergency operation is determined. Therefore, with the first embodiment, the driving recovery of the host vehicle 2 is notified to the outside of the host vehicle 2. According to this, the other road user 3 existing in the external environment of the host vehicle 2 that is notified can take a response in accordance with the notification regarding the driving recovery of the host vehicle 2 on which the emergency operation is performed. Therefore, it is possible to contribute to improvement in responsiveness of the other road user 3.

Second Embodiment

A second embodiment is a modification of the first embodiment. A processing flow according to the second embodiment is started in a situation or the like in which the host vehicle 2 is controlled in an autonomous driving state at level 3 by the driving system DS.

Figure 5:
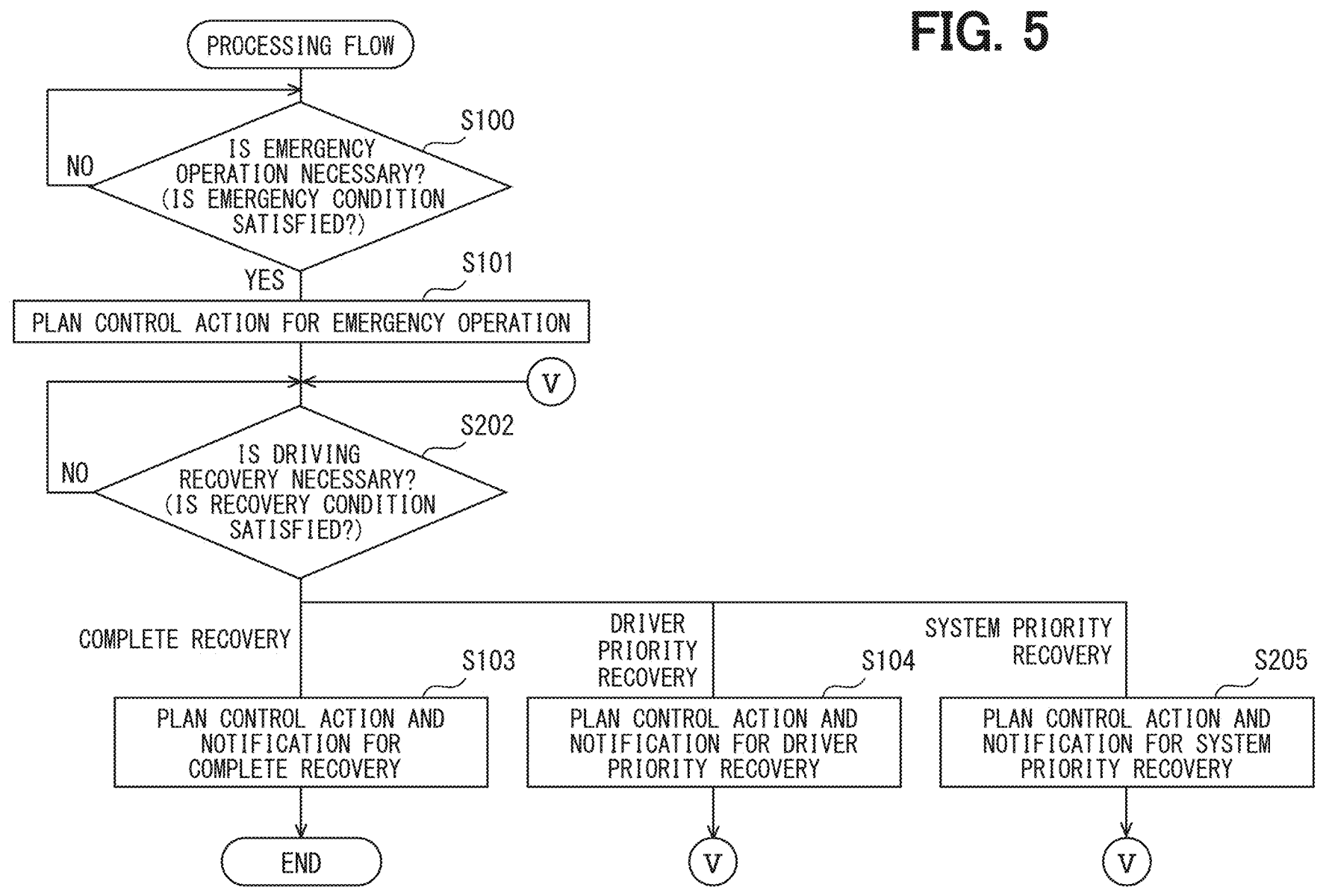

As illustrated in FIG. 5, in the processing flow of the second embodiment, S202 instead of S102, is executed following S101. Specifically, in driving recovery determined in S202, at least one of resolution of a failure in takeover/handover of the DDT to the driver and resolution of a failure in driving system DS is used as a triggering condition. In other words, a recovery condition determined in S202 further includes, in addition to a complete recovery condition and a driver priority recovery condition according to the first embodiment, a system priority recovery condition satisfied when the failure in takeover/handover to the driver is continued and the failure in driving system DS is resolved.

Therefore, in S202, in the second embodiment, when the system priority recovery condition is satisfied in which the failure in takeover/handover to the driver is to be continued and the failure in driving system DS is to be resolved, the processing flow proceeds to S205. When either the complete recovery condition or the driver priority recovery condition is satisfied in S202, the processing flow shifts to a step corresponding to the one of S103 and S104, so the description will be omitted below.

In S205, the determination block 120 determines the system priority recovery, which gives a priority to recovery of the driving system DS without takeover/handover to the driver, as driving recovery of the host vehicle 2, on which an emergency operation is performed by the driving system DS, from the emergency operation to plan a control action for the system priority recovery. In such a second embodiment, in addition to the nominal state to which the complete recovery is made in S103, a state in which a nominal operation is limited or degraded, such that takeover/handover to the driver is suspended or stopped (hereinafter, referred to as a quasi-nominal state) is a recovered state in which the driving system DS is transitioned from the emergency operation state. Accordingly, in S205, the control block 140 causes the host vehicle 2 to perform the driving recovery of the driving system DS to the quasi-nominal state by the control action planned by the determination block 120.

In S205, the determination block 120 further plans a notification of the system priority recovery in which the driving system DS starts autonomous driving in the quasi-nominal state, in accordance with the driving recovery based on the planned control action. The notification plan at this time may include generation of notification data for notifying the driver in the host vehicle 2 of the system priority recovery from the HMI device 80 of the information IF system 8. The notification plan may include generation of notification data for notifying people outside the host vehicle 2 of the system priority recovery from the external notification unit 82 of the information IF system 8. The notification plan may include generation of notification data to be transmitted from the communication system 6 to the outside of the host vehicle 2, for example, by broadcasting or the like, to notify the external center of the system priority recovery. The notification plan may include generation of notification data to be transmitted from the communication system 6 to the outside of the host vehicle 2, for example, by broadcasting or the like, to notify the mobile terminal of the other road user 3, of the system priority recovery. In S205, the control block 140 causes the host vehicle 2 to output the notification data of the system priority recovery planned by the determination block 120.

Here, the notification of the system priority recovery to the outside of the host vehicle 2 may be executed in response to the determination block 120 generating notification data that is output in a visually stimulable manner. At this time, the notification of the system priority recovery using visual stimulation may be implemented by setting a blinking pattern of the external notification unit 82 such as a hazard flasher, for example, as a different pattern in each case of the complete recovery and the driver priority recovery or a common pattern. The notification of the driver priority recovery to the outside of the host vehicle 2 may be executed in response to the determination block 120 generating notification data that is output in an audibly stimulable manner. At this time, the notification of the system priority recovery using auditory stimulation may be implemented by setting an operation pattern of the external notification unit 82 such as an electronic horn, for example, as a different pattern in each case of the complete recovery and the driver priority recovery or a common pattern in the case. In both cases of visual stimulation and auditory stimulation, the notification of the system priority recovery may be made toward the outside of the host vehicle 2, for example, toward the rear, with a directivity toward the other road user 3 who requires the notification.

In the above, when the execution of S205 is completed, the processing flow returns to S102 such that the control of the driving recovery is continued until the complete recovery. Meanwhile, in S205 that is repeated after returning from S205 to S102, when a time passing since the execution of S205, which is a first step in the repetition, exceeds a set time or is equal to or more than the set time, the planning and execution of the notification may be omitted. Further, in S205 in a case where the complete recovery condition is satisfied after returning from S205 to S102, the planning and execution of the notification may be omitted. In such a second embodiment as well, it is possible to contribute to improvement in responsiveness of the other road user 3 based on the principle according to the first embodiment.

Third Embodiment

A third embodiment is another modification of the first embodiment. A processing flow according to the third embodiment is started in, for example, a situation or the like in which the host vehicle 2 is controlled in an autonomous driving state at level 3 by the driving system DS.

Figure 6:
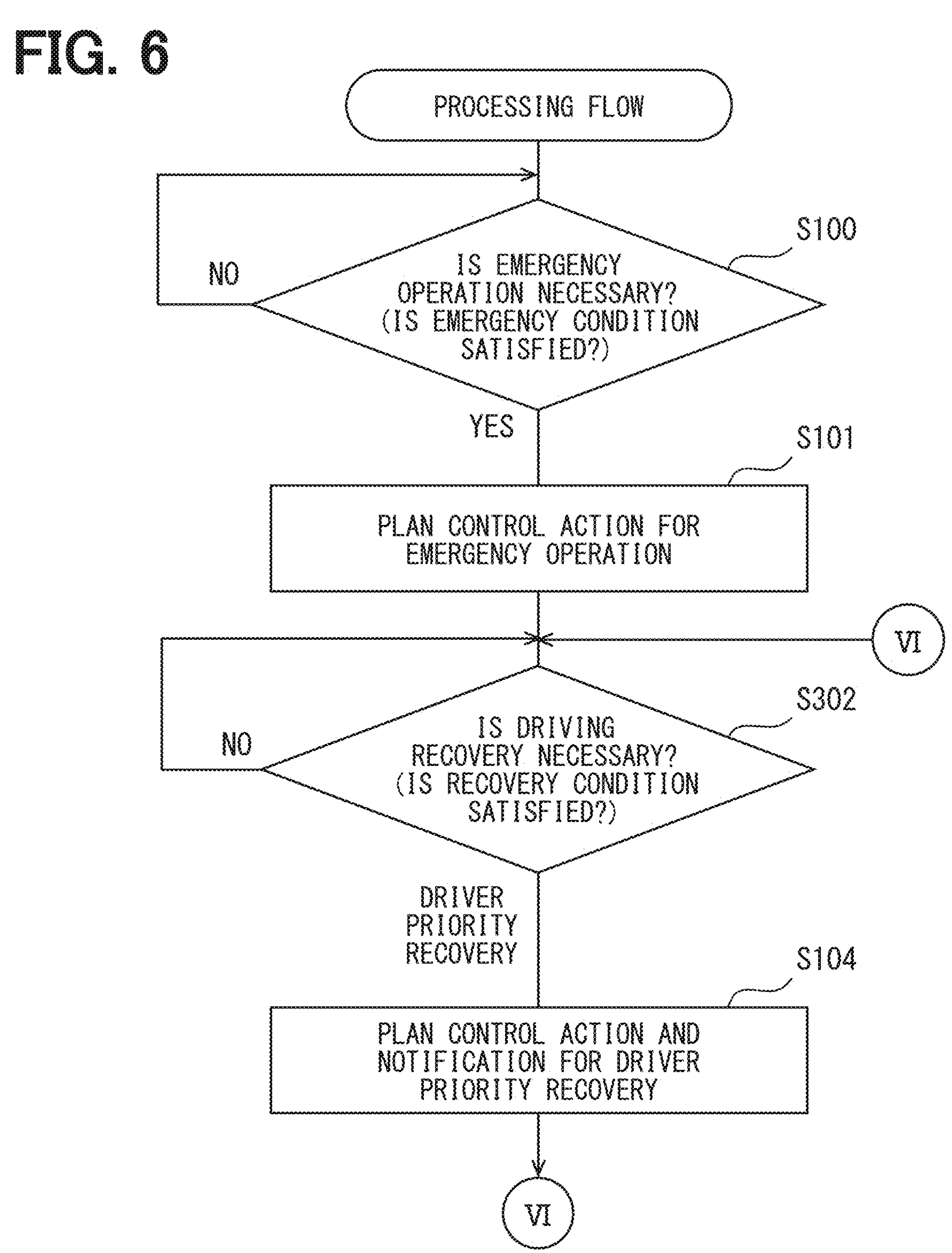
FIG. 6 is a flowchart illustrating a processing flow according to a third embodiment.

As illustrated in FIG. 6, in the processing flow of the third embodiment, S302 instead of S102, is executed following S101. Specifically, the driving recovery determined in S302 uses only the resolution of the failure in takeover/handover of the DDT to the driver as a triggering condition. That is, the driver priority recovery condition described in the first embodiment is included as the only recovery condition in S302 in the third embodiment.

Therefore, in the processing flow of the third embodiment, while the execution of S103 is omitted, the process of S104 according to the satisfaction condition by S302 is executed with the driver priority recovery as the only driving recovery. In such a second embodiment as well, it is possible to contribute to improvement in responsiveness of the other road user 3 based on the principle according to the first embodiment.

Fourth Embodiment

A fourth embodiment is a modification of the second embodiment. A processing flow according to the fourth embodiment is started in, for example, a situation or the like in which the host vehicle 2 is controlled in an autonomous driving state at level 3 by the driving system DS.

As illustrated in FIG. 7, in the processing flow of the fourth embodiment, S402 instead of S202, is executed following S101. Specifically, the driving recovery determined in S402 has the resolution of the failure in the driving system DS as at least a triggering condition. That is, the recovery condition in S402 includes the complete recovery condition described in the first embodiment and the system priority recovery condition described in the second embodiment.

Therefore, in the processing flow of the fourth embodiment, while the execution of S104 is omitted, the process of S103 or S205 is executed according to the satisfaction condition by S402. In such a fourth embodiment as well, it is possible to contribute to improvement in responsiveness of the other road user 3 based on the principle according to the first embodiment.

Fifth Embodiment

A fifth embodiment is a modification of the fourth embodiment. A processing flow according to the fifth embodiment is started in, for example, a situation or the like in which the host vehicle 2 is controlled in an autonomous driving state at level 4 or 5 by the driving system DS.

Figure 8:
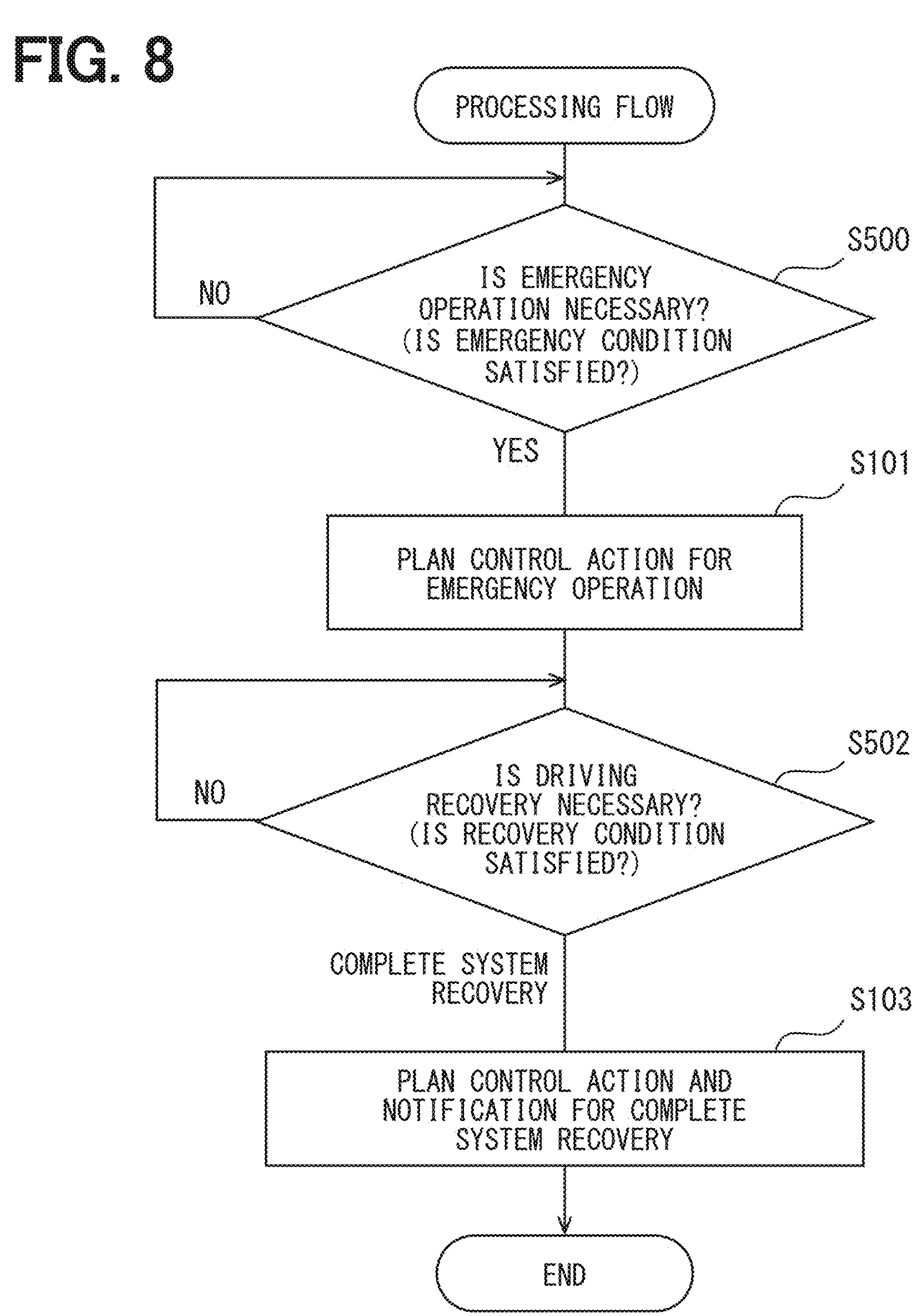
FIG. 8 is a flowchart illustrating a processing flow according to a fifth embodiment.

As illustrated in FIG. 8, in the processing flow according to the fifth embodiment, S500 and S502 are executed instead of S100 and S402, respectively. Specifically, the emergency operation determined in S500 has only by occurrence of a failure in at least one type of physical element or functional block in the driving system DS as a triggering condition. That is, the emergency condition determined in S500 includes the occurrence of the failure in physical element or functional block described in the first embodiment, as the only satisfaction condition for executing the emergency operation.

The driving recovery determined in S502 after the execution of S100 in accordance with S500 has only the resolution of the failure in the driving system DS as a triggering condition. That is, the complete system recovery condition that is satisfied when the failure in driving system DS is resolved is included as the only recovery condition in S502.

Therefore, in the processing flow of the fifth embodiment, while the execution of S205 is omitted, the process of S103 is executed according to the satisfaction condition by S502, with the complete system recovery according to the complete recovery as the only driving recovery. Meanwhile, the notification plan in S103 may also include generation of notification data for notifying the driver in the host vehicle 2 having a manual driving function or the occupant in the host vehicle 2 not having a manual driving function of the complete system recovery, from the HMI device 80 of the information IF system 8. In such a fifth embodiment as well, it is possible to contribute to improvement in responsiveness of the other road user 3 based on the principle according to the first embodiment.

Sixth Embodiment

A sixth embodiment is still another modification of the first embodiment. A processing flow according to the sixth embodiment is started in, for example, a situation or the like in which the host vehicle 2 is controlled in an autonomous driving state at level 3 by the driving system DS.

Figure 9:
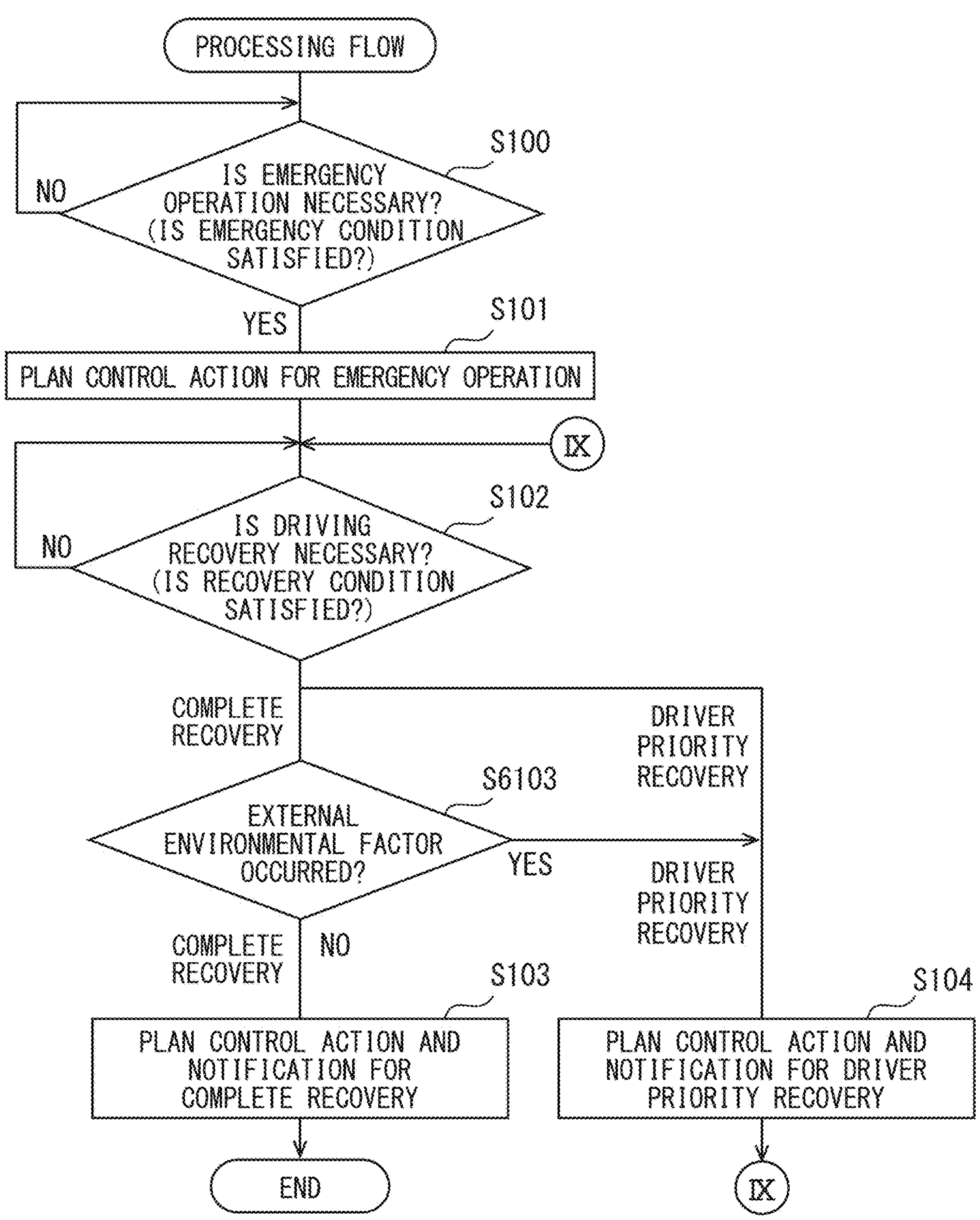
FIG. 9 is a flowchart illustrating a processing flow according to a sixth embodiment.

As illustrated in FIG. 9, in the processing flow according to the sixth embodiment, when the complete recovery condition, in which the failure in driving system DS is to be resolved and the failure in takeover/handover to the driver is to be resolved, is satisfied in S102, the processing flow proceeds to S6103.

In S6103, the determination block 120 determines whether even when the respective failures in driving system DS and in takeover/handover are both resolved, a factor that requires regulation of the transition of the driving system DS to the nominal state occurs as an external environmental factor of the host vehicle 2. Specifically, the external environmental factor determined in S6103 may be an incident that impedes the travel of the host vehicle 2, occurring in the surrounding outside of the host vehicle 2, such as a traffic accident, a natural disaster, road construction, presence of a broken vehicle, priority passage of an emergency vehicle, a system request from a police station or a fire station, a driving regulation, remaining of a fallen object, and the like. Here, the external environmental factor may be perceived by the perception block 100 and determined by the determination block 120, based on communication data from an external center 9_a_ that also serves as a dedicated computer for the processing system 1, or the external center 9_a_ different from the processing system 1 other than the host vehicle 2 illustrated in FIG. 10. The takeover/handover to manual driving is also referred to as takeover to manual driving for simplification purpose.

When a negative determination is made in S6103, that is, when there is no need to regulate the transition of the driving system DS to the nominal state by the external environmental factor, the processing flow proceeds to S103 of the determination confirmation of the complete recovery. Accordingly, in S103, the determination block 120 plans a control action and a notification for the complete recovery in the same manner as in the first embodiment, as the driving recovery of the host vehicle 2 on which the emergency operation is performed by the driving system DS.

On the other hand, when an affirmative determination is made in S6103, that is, when the transition to the nominal state of the driving system DS is limited by the external environmental factor of the host vehicle 2, the determination is changed from the complete recovery to the driver priority recovery and the processing flow proceeds to S104. Accordingly, in S104, the determination block 120 plans a control action and a notification for the driver priority recovery in the same manner as in the first embodiment, as the driving recovery of the host vehicle 2 on which the emergency operation is performed by the driving system DS.

Figure 10:
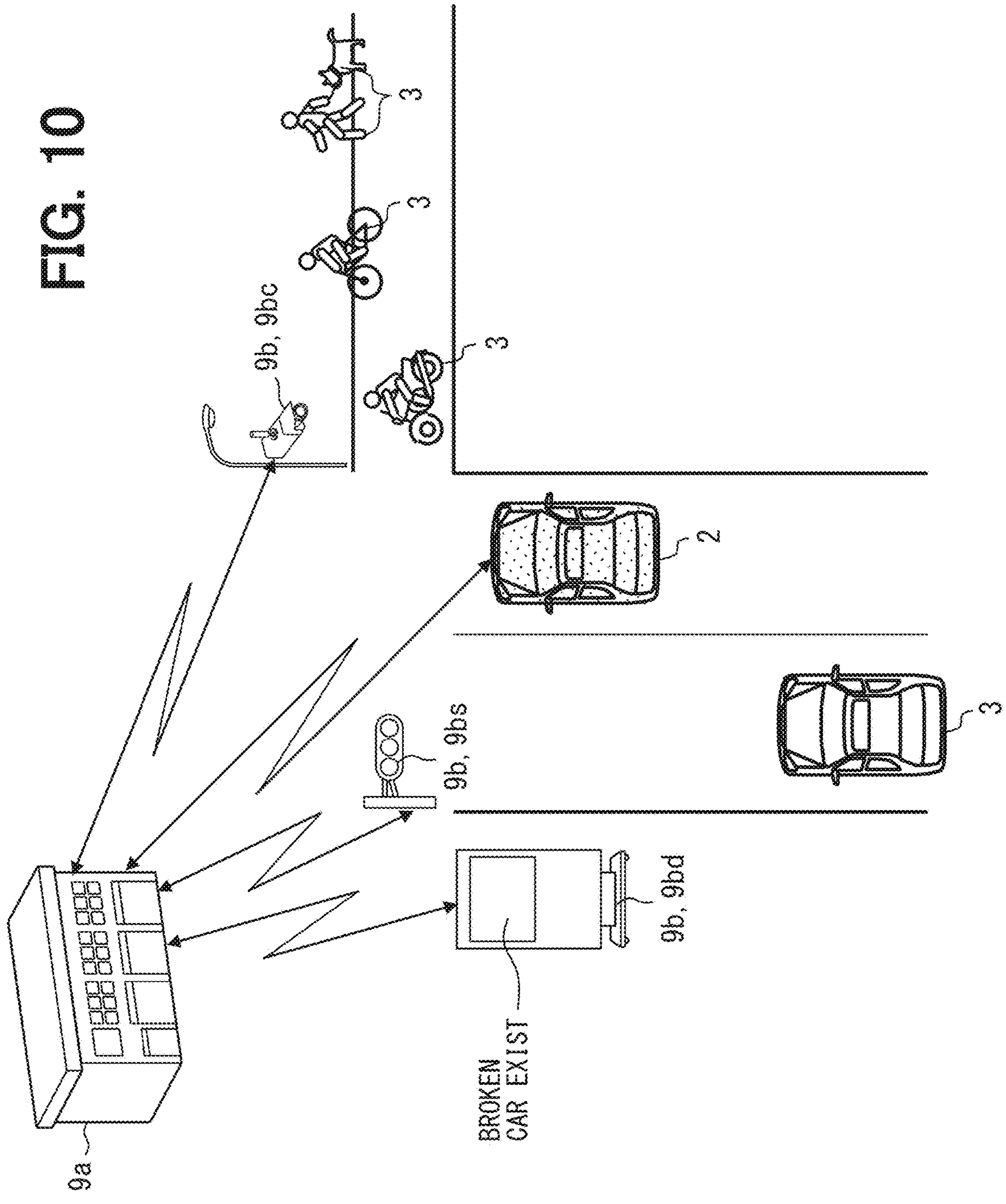
FIG. 10 is a schematic diagram illustrating a travel environment of a host vehicle to which the sixth embodiment is applied.

Meanwhile, in S104 of the sixth embodiment, as illustrated in FIG. 10, in response to a control instruction given from the external center 9*a* that communicates with the host vehicle 2 to an infrastructure unit 9*b* in the surrounding outside of the same vehicle 2, notification data for notifying the driver priority recovery for cooperation is generated. This means that the control instruction given by the external center 9*a* to the infrastructure unit 9*b* in response to the occurrence of the external environmental factor, and the notification itself and/or the control action for the driver priority recovery, which is a target of the notification based on the notification data, are mutually linked for cooperation.

Here, in a case of a traffic light 9*bs*, the infrastructure unit 9*b* may control, for example, a lighting state or the like in which traffic guidance is possible to cooperate with the notification and/or the control action for the driver priority recovery of the host vehicle 2 according to the external environmental factor, according to the control instruction from the external center 9*a*. In a case of a digital signage 9*bd*, the infrastructure unit 9*b* may control, for example, a display content such as a recommended action to cooperate with the notification and/or the control action for the driver priority recovery of the host vehicle 2 according to the external environmental factor, according to the control instruction from the external center 9*a*. In a case of an infrastructure camera 9*bc*, the infrastructure unit 9*b* may control, for example, an imaging state such as a zoom setting to cooperate with the notification and/or the control action for the driver priority recovery of the host vehicle 2 according to the external environmental factor, according to the control instruction from the external center 9*a*.

In S104 of the sixth embodiment, notification data may be generated to notify of the driver priority recovery for cooperation as notification data for notifying of the driver priority recovery, in response to a control request given from the external center 9*a* communicating with the host vehicle 2 to a mobile terminal of the other road user 3 in the surrounding outside of the host vehicle 2. In this case, the mobile terminal may control, for example, a display content such as a recommended action to coordinate with the notification and/or the control action for the driver priority recovery of the host vehicle 2 according to the external environmental factor, in accordance with the control request from the external center 9*a*.

In S104 of the sixth embodiment, notification data for notifying the driver in the host vehicle 2 from the HMI device 80 in the information IF system 8 of the driver priority recovery when the complete recovery is limited by the external environmental factor may be generated. At this time, the notification data may be outputted in a visually stimulable manner, or outputted in an audibly stimulable manner.

The sixth embodiment described above may also be applied to the second embodiment, in the same manner as a modification illustrated in FIG. 11.

Other Embodiments

Although multiple embodiments are described above, the present disclosure is not construed as being limited to these embodiments, and can be applied to various embodiments and combinations within a scope that does not depart from the gist of the present disclosure.

In another modification, a dedicated computer constituting the processing system 1 may include at least one of a digital circuit and an analog circuit, as a processor. Here, the digital circuit is at least one type of, for example, an application specific integrated circuit (ASIC), a field programmable gate array (FPGA), a system on a chip (SOC), a programmable gate array (PGA), a complex programmable logic device (CPLD), and the like. Such a digital circuit may also include a memory in which a program is stored.

In still another modification, a driver who is an operator among occupants of the host vehicle 2 may be replaced by a remote operator or a remote driver who remotely operates the host vehicle 2 at an external center. In still another modification related to the fifth embodiment, a host moving object to which the driving system DS and the processing system 1 are applied may be an autonomous traveling robot capable of transporting parcels, collecting information, and the like by autonomous traveling or remote traveling. In addition to the above, the processing system 1 according to each of the embodiments and the modifications may be executed in a form of a processing circuit (for example, processing ECU or the like) or a semiconductor device (for example, semiconductor chip or the like), as a processing device configured to be mounted on a host moving object and including at least one processor 12 and one memory 10.

Description of Terms

Terms related to the present disclosure will be described below. This description is included in the embodiments of the present disclosure.

A road user may be a anyone who uses a road including sidewalk and other adjacent spaces. The road user may be a user on an active road or a road adjacent to the active road, for the purpose of moving from one location to another location.

An other road user may be a vulnerable road user and a non-vulnerable road user with no role in an autonomous driving subject vehicle.

A dynamic driving task (DDT) may be real-time operational and tactical functions required to operate a vehicle in traffic.

A behavior of a subject vehicle may be obtained by interpreting a vehicle motion based on traffic conditions. Here, the vehicle motion may be a vehicle state and its dynamics in terms of physical quantities (for example, a speed, an acceleration, and the like).

A scenario may be a description of the temporal relationship between several scenes, with goals and values within a specified situation in a sequence of scenes influenced by actions and events. The scenario may be a depiction of consecutive time series of activities integrating the subject vehicle, all its external environment and their interactions in the process of performing a certain driving task.

A situation is a factor that can affect a behavior of a system, and may include traffic conditions, weather, and the behavior of the subject vehicle.

A triggering condition may be a specific condition of a scenario that serves as an initiator for a subsequent system reaction contributing to either a hazardous behavior or an inability to prevent or detect and mitigate a reasonably foreseeable indirect misuse.

An operational design domain (ODD) may be a specific condition under which a given (automated) driving system is designed to function. The operational design domain may be an operating condition under which a given (automated) driving system or feature is specifically designed to function, including, but not limited to, environmental, geographical, and time-of-day restrictions, and/or the requisite presence or absence of a necessity of certain traffic or roadway characteristics.

An automated driving system may be a set of hardware and software that can execute the entire DDT on a continuous basis, regardless of whether it is limited to a specific ODD.

Safety of the intended functionality (SOTIF) may be the absence of unreasonable risk due to inadequacy of the intended functionality or its implementation.

A driving policy may be a strategy and a rule that define a control action at a vehicle level.

A vehicle level SOTIF strategy (VLSS) may be the set of vehicle-level requirements for the intended functionality (3.14) used to support design, verification and validation activities to achieve the SOTIF.

An unreasonable risk may be a risk judged to be unacceptable in a certain context according to valid societal moral concepts.

Safety-related models may be representation of safety-related aspects of the driving action based on assumptions about reasonably foreseeable behaviors of other road users. The safety-related models may be an on-board or off-board safety checker device or safety analysis device, a mathematical model, a set of more conceptual rules, a set of scenario-based behaviors, or a combination thereof.

A proper response may be an action that resolves an hazardous situation when the other road user is acting in accordance with assumptions on a reasonably foreseeable behavior.

A safe state may be a reasonably safe operation mode.

A minimal risk condition (MRC) may be a vehicle state in order to reduce the risk, when a given trip cannot be completed. The minimal risk condition may be a condition to which a user or an (automated) driving system may bring a vehicle after performing the minimal risk manoeuvre in order to reduce the risk of a crash when a given trip cannot be completed.

A minimal risk manoeuvre (MRM) may be (automated) driving system's capability of transitioning the vehicle between nominal and minimal risk conditions.

A DDT fallback may be a response by a driver or the (automated) driving system to either perform the DDT or transition to the MRC after the occurrence of a failure(s) or detection of a functional insufficiency or upon detection of a potentially hazardous behavior.

An emergency manoeuvre may be a manoeuvre performed by a vehicle in case of an event in which the vehicle is at imminent collision risk and has the purpose of avoiding or mitigating a collision.

A takeover may be a transfer of driving tasks between the (automated) driving system and the driver.

The driver may be a user who performs in real-time part or all of the DDT and/or DDT fallback for a particular vehicle. A remote driver may be a driver who is not seated in a position to manually operate in-vehicle braking, accelerating, steering, and transmission gear selection input devices but is able to operate the vehicle.

An operator may be a designated person, appropriately trained and authorized, to operate a car. The remote operator may be an operator who is not seated in a position to manually operate in-vehicle braking, accelerating, steering, and transmission gear selection input devices but is able to operate the vehicle with or without direct vision.

What is claimed is:

1. A processing method executed by a processor to perform a processing related to driving of a host moving object with a driving system, the processing method comprising:

determining a driving recovery of the host moving object, which is a recovery from an emergency operation of the host moving object to a driving operation of the host moving object, when the emergency operation is performed by the driving system; and notifying other road users existing in an external environment of the host moving object about the driving recovery of the host moving object by changing a notification state.

2. The processing method according to claim 1, further comprising determining whether the driving recovery of the host moving object is caused by a takeover by an operator of the host moving object.

3. The processing method according to claim 2, further comprising determining that the driving recovery of the host moving object is caused by the takeover by the operator of the host moving object when a failure in the driving system is continued and a failure in the takeover by the operator of the host moving object is resolved.

4. The processing method according to claim 1, further comprising determining whether the driving recovery of the host moving object is caused by a transition of the driving system from the emergency operation to a recovered state.

5. The processing method according to claim 4, further comprising determining that the driving recovery of the host moving object is caused by the transition of the driving system from the emergency operation to the recovered state when a failure in the driving system is resolved and a failure in an a takeover by an operator of the host moving object is resolved.

6. The processing method according to claim 5, further comprising determining that the driving recovery of the host moving object is caused by a takeover by an operator of the host moving object when the transition of the driving system from the emergency operation to the recovered state is limited by an external environmental factor of the host moving object, although the failure in the driving system is resolved and the failure in the takeover by the operator of the host moving object is resolved.

7. The processing method according to claim 4, further comprising determining that the driving recovery of the host moving object is caused by a transition of the driving system from the emergency operation to a limited recovered state when a failure in a takeover by an operator of the host moving object continues and a failure in the driving system is resolved.

8. The processing method according to claim 1, further comprising generating notification data to be transmitted to the external environment of the host moving object for notifying the driving recovery of the host moving object.

9. The processing method according to claim 1, further comprising generating notification data that notifies the driving recovery of the host moving object in a cooperated manner with a control instruction transmitted from an external center, which communicates with the host moving object, to an infrastructure unit, which exists around the host moving object.

10. The processing method according to claim 1, further comprising generating notification data that notifies the driving recovery of the host moving object in a visually stimulable manner toward the external environment of the host moving object when the notification data is output.

11. The processing method according to claim 1, further comprising generating notification data that notifies the driving recovery of the host moving object in an audibly stimulable manner toward the external environment of the host moving object when the notification data is output.

12. A driving system comprising:

a computer-readable non-transitory storage medium; and a processor, by executing a program stored in the computer-readable non-transitory storage medium, performing processing related to driving of a host moving object, wherein the processing, by executing a program stored in the computer-readable non-transitory storage medium, is configured to:

determine a driving recovery of the host moving object, which is a recovery from an emergency operation of the host moving object to a driving operation of the host moving object, when the emergency operation is performed by the driving system; and notify other road users existing in an external environment of the host moving object about the driving recovery of the host moving object by changing a notification state.

13. A processing program product stored in a computer-readable non-transitory storage medium, the processing program product comprising instructions to be executed by at least one processor for performing a processing related to driving of a host moving object with a driving system, the instructions comprising:

determining a driving recovery of the host moving object, which is a recovery from an emergency operation of the host moving object to a driving operation of the host moving object, when the emergency operation is performed by the driving system; and notifying other road users existing in an external environment of the host moving object about the driving recovery of the host moving object by changing a notification state.

* * * * *